(Model.)
I. H. SHAMBAUGH.
CHURN.
No. 443,410. Patented Dec. 23, 1890.
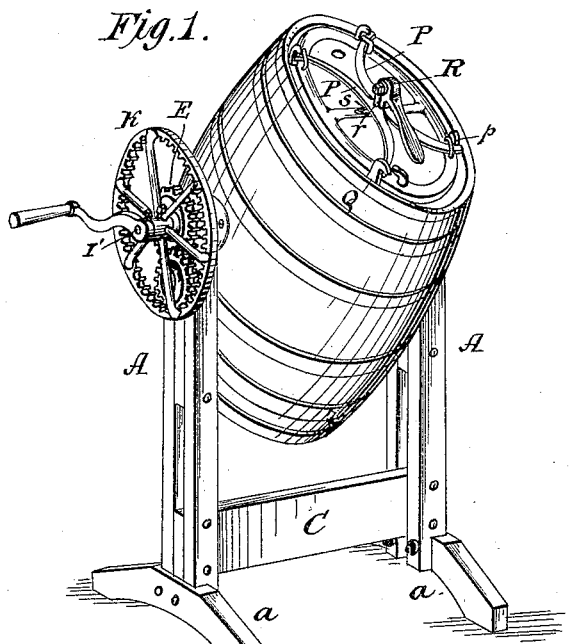
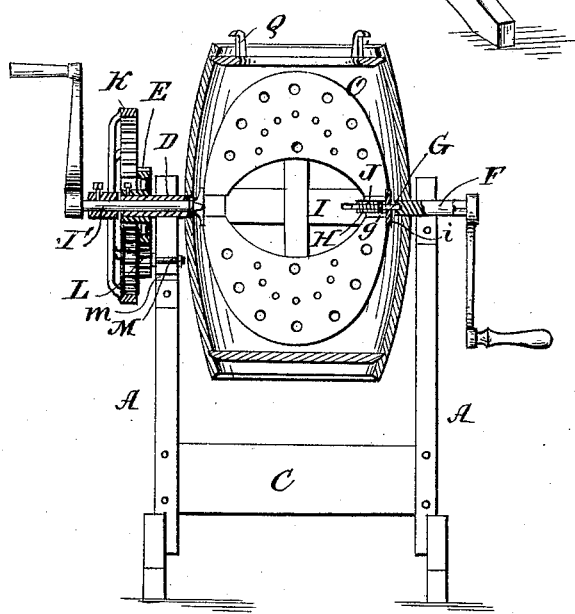
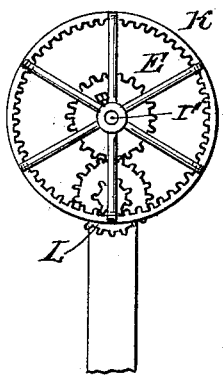
Witnesses
Saml. R. Turner.
Van Buren Hillyard.
Inventor
Isaac Henry Shambaugh.
By his Attorneys
R.S. & A.P. Lacey

UNITED STATES PATENT OFFICE.

ISAAC HENRY SHAMBAUGH, OF AVILLA, INDIANA.

CHURN.

SPECIFICATION forming part of Letters Patent No. 443,410, dated December 23, 1890.

Application filed March 28, 1890. Serial No. 345,736. (Model.)

*To all whom it may concern:*

Be it known that I, ISAAC HENRY SHAMBAUGH, a citizen of the United States, residing at Avilla, in the county of Noble and State of Indiana, have invented certain new and useful Improvements in Churns; and I do hereby declare the following to be a full, clear, and exact description of the invention, such as will enable others skilled in the art to which it appertains to make and use the same.

This invention relates to that class of churns in which the churn-body and the dasher revolve in opposite directions.

The purpose of the invention is to provide mechanism which will be interchangeable in its parts to vary the relative speed of the dasher and the churn-body.

The improvement consists of the novel features which will be hereinafter more fully described and claimed, and which are shown in the annexed drawings, in which—

Figure 1 is a perspective view of a churn embodying my invention. Fig. 2 is a vertical central section. Fig. 3 is a detail view showing the churn differently speeded from Figs. 1 and 2.

The frame may be of any suitable construction, and, as shown, comprises two standards A, having feet a and a cross-piece C, which connects and braces the said standards. The churn-body, which may be of any desired shape, is preferably formed like a barrel, and is journaled at its sides between the upper ends of the standards A. The journal D is tubular, and is secured to the churn-body, and on the outer end thereof is keyed or otherwise fastened the gear-wheel E. The journal F passes loosely through the side of the churn-body and is recessed at its inner end to receive the projecting end of the spring-pressed pin G in the opposing end of the dasher-shaft. This pin is inserted in an opening or recess H in the dasher-shaft I, and has a collar g between its ends which engages with plate i, applied to the end of the dasher-shaft and through which the said pin projects. The outer end of recess H is sufficiently large to receive the spring J, which is mounted on the inner end of pin G, and permits a free movement of said spring and pin G. The spring J bears against collar g and the inner end of the enlarged recess. The dasher-shaft is provided at the end opposite that which receives journal F, with journal I, which extends through the tubular journal D, and the master-wheel K is secured on the outer end of the said journal I'. The master-wheel K is internally toothed and is about three times as large as the gear-wheel E, and is in a different vertical plane from the said gear-wheel.

L is a differential pinion—that is, it is composed of two toothed sections l and l', which are designed to mesh with the master-wheel K and with the gear-wheel E. This pinion is mounted on a stud-shaft M, which is adapted to be moved a greater or less distance from the axis of the churn to permit the substitution of a larger or smaller pinion for that shown when it is desired to vary the relative speeds of the dasher and the churn-body. For the sake of simplicity of construction, the differential pinion L is reversible on the stud-shaft M, and the latter is adjustable to and from the axis of the churn by shifting it from one to the other of the series of openings m provided in the standard to which it is secured. (See Fig. 2.)

The dasher is composed of segmental or crescent-shaped wings O, which are perforated to facilitate the churning process.

The churn may be operated by a crank applied to either journal I' or to the journal F, or to both.

Motion is transmitted from master-wheel K to the gear-wheel E through pinion L, and drives the churn-body in a reverse direction to the dasher, as will be readily comprehended.

The barrel top or churn-cover is secured in place by two oppositely-curved bars P, the ends of which pass through staples p, near the edges of the cover and engage with hooks Q, secured to the churn-body. The cam-lever R, for operating the bars P, is journaled between the standards r, which pass through openings in said bars and are secured to the cover. The links S connect the bars P midway of their ends with the cover.

Having thus described my invention, what I claim, and desire to secure by Letters Patent, is—

1. In a churn, the combination, with the frame, the churn-body, and dasher concentrically journaled, the dasher-shaft passing loosely through the hollow journal of the churn-body, of the master-wheel K, secured on the dasher-shaft, the gear-wheel E, held on the journal of the churn-body, and the interchangeable differential pinion adapted to mesh with the gear-wheels K and E to vary the relative speeds of the churn-body and dasher, substantially as described.

2. The hereinbefore-specified churn, composed of the frame, the churn-body journaled between the standards of the frame and having tubular journal D at one side, the dasher-shaft I, having journal I' at one end, which is thrust through the journal D, and having recess H at its opposite end, the pin G, inserted in the said recess H and having collar $g$, the spring J, mounted on pin G and pressing outward on collar $g$, the journal F, passing loosely through a standard of the frame and through the side of the churn-body and engaging with the pin G, the gear-wheel E on the tubular shaft D, the gear-wheel K on journal I' of the dasher-shaft, the shiftable shaft M, and the interchangeable differential pinion L, mounted on the shaft M and meshing with the gear-wheels E and K, substantially as and for the purpose described.

In testimony whereof I affix my signature in presence of two witnesses.

ISAAC HENRY SHAMBAUGH.

Witnesses:
MICHAEL DOLAN,
DANIEL PILGRIM.